US012791824B2

(12) United States Patent
Chien et al.

(10) Patent No.: US 12,791,824 B2
(45) Date of Patent: Nov. 10, 2026

(54) DRIVING MECHANISM

(71) Applicant: Actutek Corporation, Taoyuan City (TW)

(72) Inventors: Jui-Ta Chien, Taoyuan City (TW); Chen-Hung Chao, Taoyuan City (TW); Sin-Jhong Song, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 188 days.

(21) Appl. No.: 18/764,566

(22) Filed: Jul. 5, 2024

(65) Prior Publication Data

US 2025/0020972 A1 Jan. 16, 2025

Related U.S. Application Data

(60) Provisional application No. 63/513,701, filed on Jul. 14, 2023.

(30) Foreign Application Priority Data

Feb. 28, 2024 (CN) ......................... 202410221531.7

(51) Int. Cl.

*G02B 7/08* (2021.01)
*G02B 27/64* (2006.01)
*G03B 3/10* (2021.01)

(52) U.S. Cl.

CPC ............. *G02B 7/08* (2013.01); *G02B 27/646* (2013.01); *G03B 3/10* (2013.01)

(58) Field of Classification Search

CPC ......... G03B 3/10; G03B 17/02; G02B 27/646
See application file for complete search history.

(56) References Cited

FOREIGN PATENT DOCUMENTS

| | | | | |
|---|---|---|---|---|
| CN | 219065853 U | * | 5/2023 | ............... G02B 7/02 |
| JP | 2018013782 A | * | 1/2018 | ............. G03B 17/12 |
| KR | 20180037690 A | * | 4/2018 | ........... H04N 5/2253 |

* cited by examiner

*Primary Examiner* — Minh Q Phan

(74) *Attorney, Agent, or Firm* — MUNCY, GEISSLER, OLDS & LOWE, P.C.

(57) ABSTRACT

A driving mechanism for moving an optical element is provided. The driving mechanism includes a fixed part, a movable part, and a driving assembly. The movable part is movably connected to the fixed part for holding the optical element. The driving assembly is configured for moving the movable part relative to the fixed part.

18 Claims, 9 Drawing Sheets

DRIVING MECHANISM

This application claims the benefit of U.S. Provisional Application No. 63/513,701, filed Jul. 14, 2023, the entirety of which is incorporated by reference herein.

This application claims priority of China Patent Application No. 202410221531.7, filed on Feb. 28, 2024, the entirety of which is incorporated by reference herein.

BACKGROUND OF THE INVENTION

Field of the Invention

The present invention relates to a driving mechanism, and, in particular, to a driving mechanism for moving an optical element.

Description of the Related Art

As technology has advanced, a lot of electronic devices (for example, laptop computers and smartphones) have incorporated the functionality of taking photographs and recording video. These electronic devices have become more commonplace, and have been developed to be more convenient and thin. More and more options are provided for users to choose from.

Electronic devices usually use several coils and corresponding magnets to adjust the focus of a lens. However, miniaturization of these electronic devices may increase the difficulty of mechanical design, and this may also lead to low reliability and low driving force for moving the lens. Therefore, addressing the aforementioned problems has become a challenge.

BRIEF SUMMARY OF THE INVENTION

An embodiment of the present invention provides a driving mechanism for moving an optical element that has an optical axis. The driving mechanism includes a fixed part, a movable part, and a driving assembly. The movable part is movably connected to the fixed part for holding the optical element. The driving assembly is configured for moving the movable part relative to the fixed part.

In some embodiments, the driving mechanism further includes an upper spring sheet, wherein the fixed part includes a housing and a base connected to each other, the housing has a top portion, and at least a sidewall extending from the top portion toward the base, and the upper spring sheet is disposed on the inner surface of the top portion.

In some embodiments, two ribs are formed on the sidewall, and the driving assembly includes a coil and a magnetic element, wherein the coil is disposed on the movable part, and the magnetic element is disposed on the sidewall and positioned between the ribs.

In some embodiments, the driving mechanism further includes a circuit assembly, wherein the base has a first restricting structure and a second restricting structure extending toward the housing, and the circuit assembly is positioned between the first and second restricting structures.

In some embodiments, a first cavity is formed on the first restricting structure, a second cavity is formed on the second restricting structure, and a glue is disposed in the first and second cavities for connecting the circuit assembly to the first and second restricting structures.

In some embodiments, the base further has a first column and a second column, the first column is connected to the first restricting structure, and the second column is connected to the second restricting structure, wherein the first and second columns and the first and second restricting structures extend into the housing.

In some embodiments, the housing further has a protruding structure, and the first column has an outer connecting portion that forms a depressed structure, wherein the protruding structure and the depressed structure are located at a corner of the driving mechanism and adhered to each other.

In some embodiments, the driving mechanism further includes a damping gel, wherein the first column further has an inner connecting portion, and the damping gel is connected between the movable part and the inner connecting portion.

In some embodiments, the inner connecting portion forms a recess for receiving the damping gel.

In some embodiments, the driving mechanism further a lower spring sheet and a conductive member, wherein the lower spring sheet is connected between the base and the movable part, the conductive member is embedded in the base and has a contact pad exposed to the top side of the base, and the lower spring sheet has an end portion electrically connected to the contact pad, wherein the end portion and the contact pad are located on the outer side of the first column.

In some embodiments, the protruding structure of the housing, the end portion of the lower spring sheet, and the contact pad of the conductive member partially overlap along the optical axis.

In some embodiments, the end portion of the lower spring sheet is situated between the protruding structure of the housing and the contact pad of the conductive member along the optical axis.

In some embodiments, the driving mechanism further includes two wires and two lower spring sheets, wherein the lower spring sheets are connected between the base and the movable part, the movable part has two winding posts, and each of the lower spring sheets has a recessed portion, wherein the wires are wound on the winding posts and electrically connected to the recessed portions of the lower spring sheets.

In some embodiments, the recessed portions are facing the same direction.

In some embodiments, the fixed part includes a plastic housing and a base connected to each other, the base forms a first column extending toward the housing, the housing forms a protruding structure, and the first column has an outer connecting portion that forms a depressed structure adhered to the protruding structure, wherein the protruding structure and the depressed structure are located at a corner of the driving mechanism.

In some embodiments, the driving mechanism further includes a damping gel, wherein the first column further has an inner connecting portion, and the damping gel is connected between the movable part and the inner connecting portion.

In some embodiments, the inner connecting portion forms a recess for receiving the damping gel.

In some embodiments, the driving mechanism further includes a lower spring sheet and a conductive member, wherein the lower spring sheet is connected between the base and the movable part, the conductive member is embedded in the base and has a contact pad exposed to the top side of the base, and the lower spring sheet has an end portion electrically connected to the contact pad, wherein the end portion and the contact pad are located on the outer side of the first column.

In some embodiments, the protruding structure of the housing, the end portion of the lower spring sheet, and the contact pad of the conductive member partially overlap along the optical axis.

In some embodiments, the end portion of the lower spring sheet is situated between the protruding structure of the housing and the contact pad of the conductive member along the optical axis.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The making and using of the embodiments of the driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as “top,” “bottom,” “left,” “right,” “front,” “back,” etc., is used with reference to the orientation of the figures being described. The components of the present invention can be positioned in a number of different orientations. As such, the directional terminology is used for the purposes of illustration and is in no way limiting.

Figure 1:
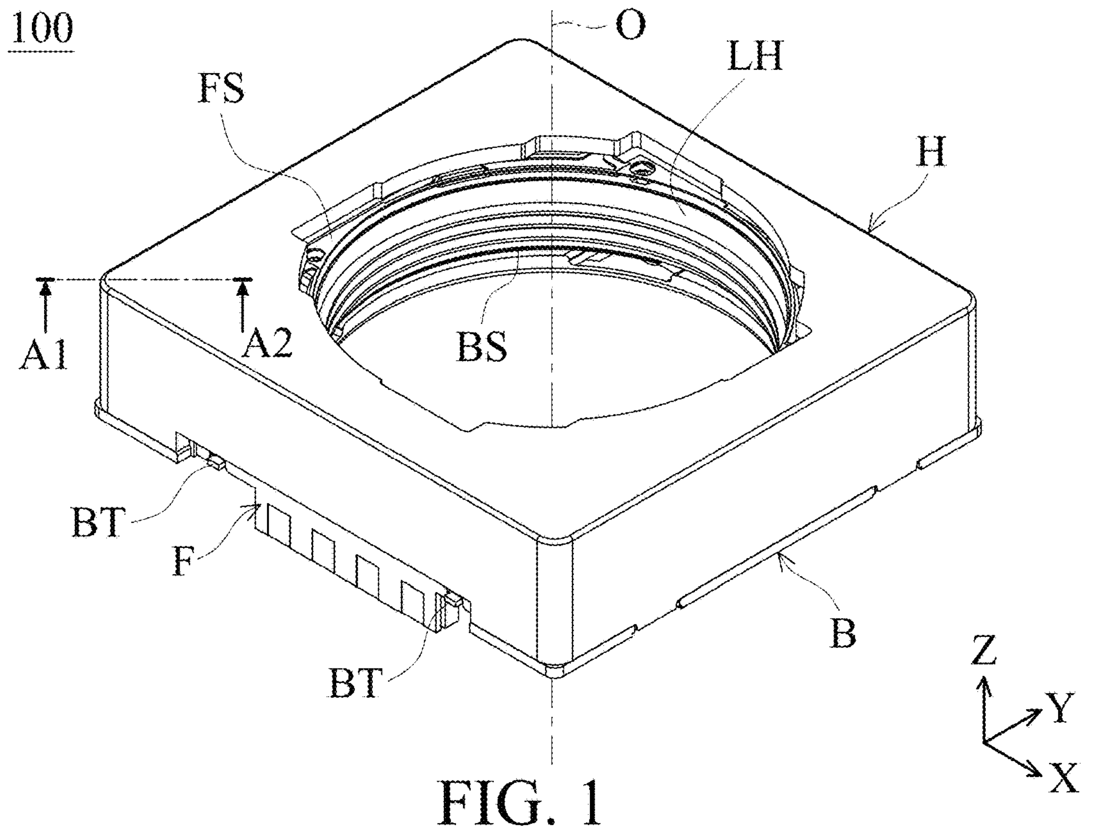
FIG. 1 is a perspective diagram of a driving mechanism 100 in accordance with an embodiment of the invention.
Figure 2:
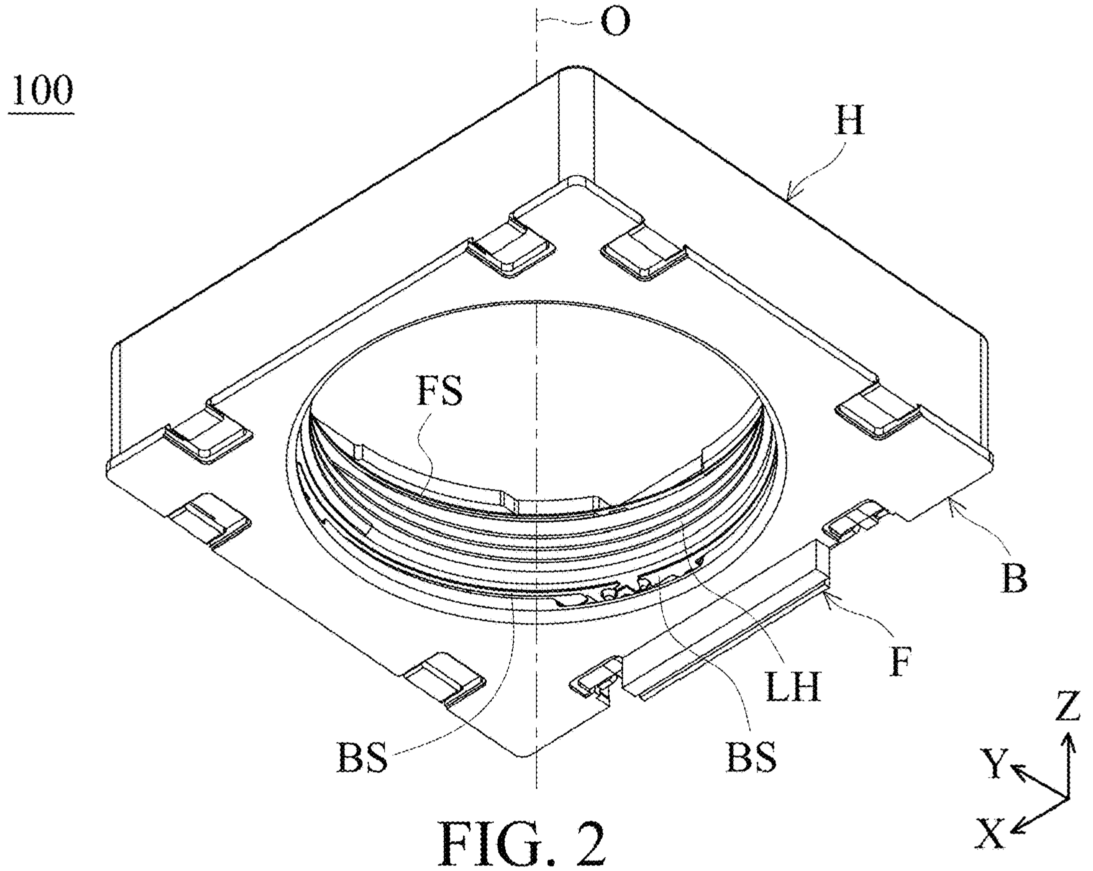
FIG. 2 is another perspective diagram of the driving mechanism 100 in FIG. 1.
Figure 3:
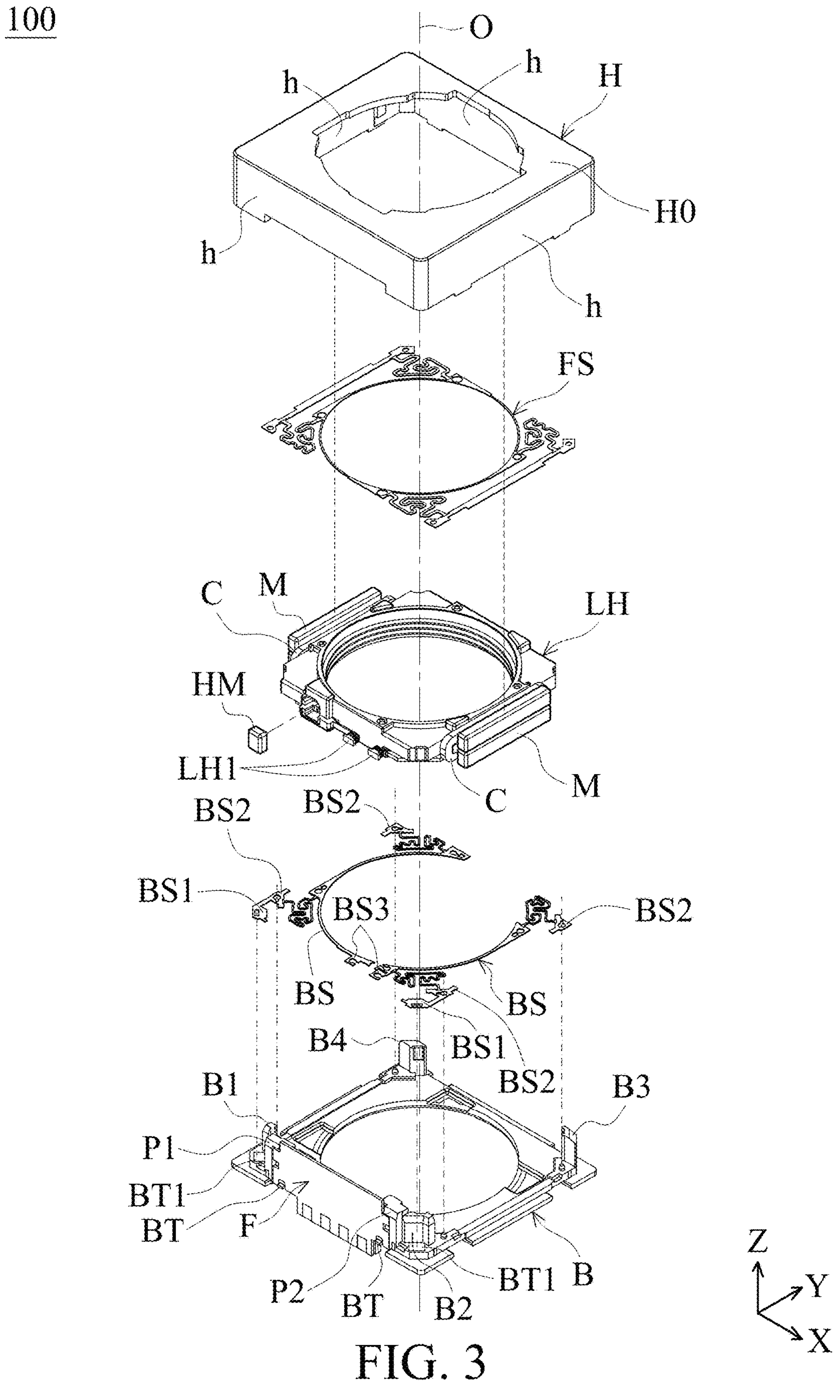
FIG. 3 shows an exploded view of the driving mechanism 100 in FIGS. 1 and 2.
Figure 4:
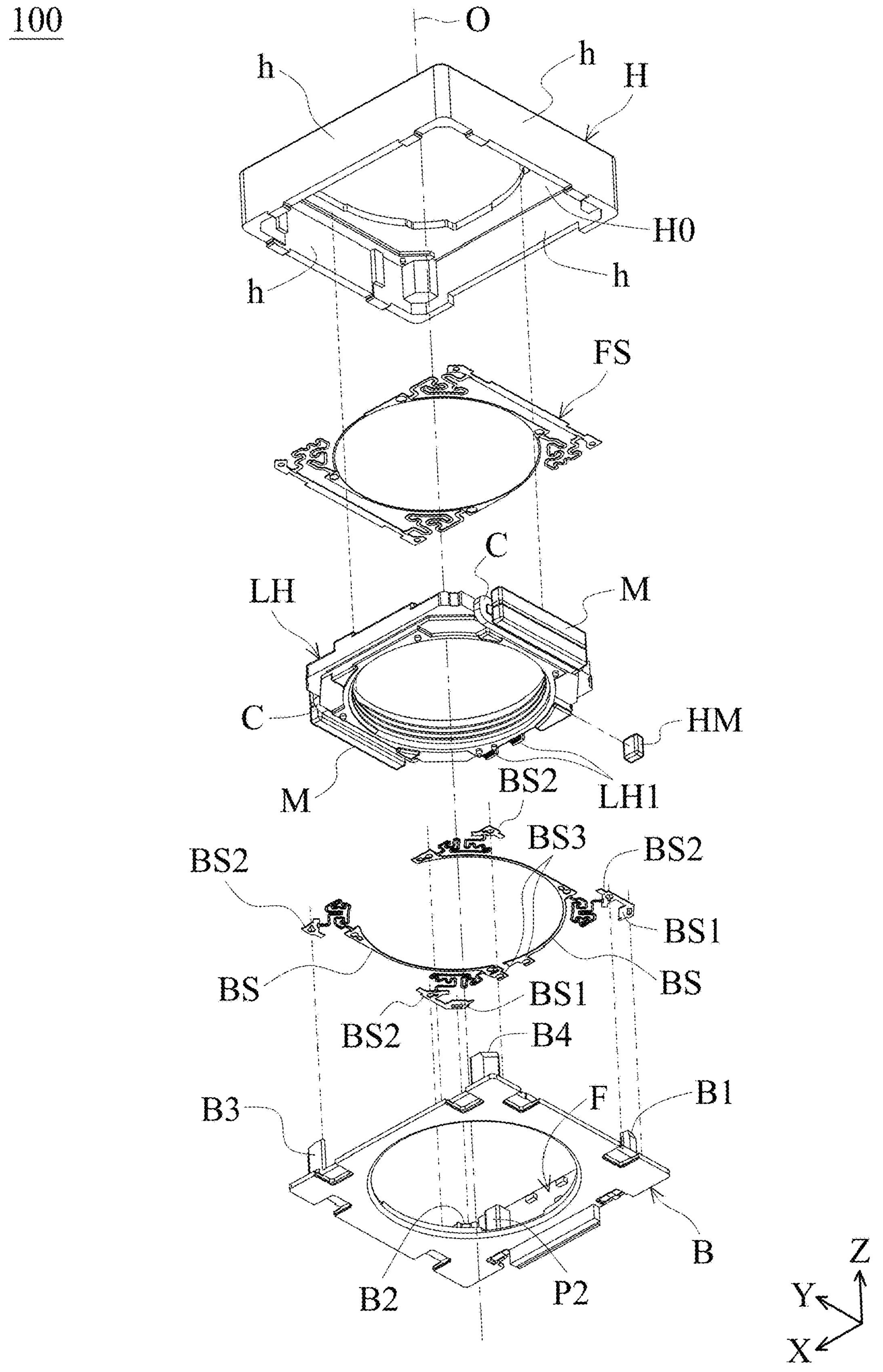
FIG. 4 shows another exploded view of the driving mechanism 100 in FIGS. 1 and 2.

FIG. 1 is a perspective diagram of a driving mechanism 100 in accordance with an embodiment of the invention. FIG. 2 is another perspective diagram of the driving mechanism 100 in FIG. 1. FIG. 3 shows an exploded view of the driving mechanism 100 in FIGS. 1 and 2. FIG. 4 shows another exploded view of the driving mechanism 100 in FIGS. 1 and 2.

Referring to FIGS. 1-4, the driving mechanism 100 in this embodiment is a Voice Coil Motor (VCM) which may be disposed in a cell phone or other portable electronic device for driving an optical element (e.g. optical lens) to move, thereby achieving the function of auto-focusing (AF) or Optical Image Stabilization (OIS).

The driving mechanism 100 primarily comprises a plastic housing H, a plastic base B, a circuit assembly F, a holder LH, an upper spring sheet FS, at least one lower spring sheet BS, at least one magnetic element M, and at least one coil C.

In this embodiment, the housing H has a hollow structure affixed to the quadrilateral base B, and the circuit assembly F is mounted on a side of the base B. Here, the housing H and the base B form a fixed part of the driving mechanism 100. During assembly, four protrusions B1, B2, B3, B4 and two restricting structures P1, P2 of the base B extend into the housing H, wherein the restricting structures P1, P2 are configured to restrict the circuit assembly F in a predetermined position. Moreover, the protrusions B1, B2, B3, B4 and the restricting structures P1, P2 may be adhered to the inner surface of the housing H by the glue.

The holder LH is movably received in the housing H, and an optical element (not shown) is affixed in the holder LH. The holder LH forms a movable part that is movable relative to the fixed part (the housing H and the base B).

The holder LH is connected to the housing H and the base B via the upper and lower spring sheets FS and BS, so that the holder LH can be suspended within the driving mechanism 100. With the configuration as described above, external light can enter the driving mechanism 100 substantially along the optical axis O of the optical element, and light can propagate through the optical element (optical lens) in the −Z direction to an image sensor (not shown) below the base B to form a digital image.

It should be noted that two oval-shaped coils C are disposed on opposite sides of the holder LH. Moreover, two magnetic elements M (e.g. magnets) are disposed on the inner sides of the housing H and located corresponding to the coils C. The coils C and the magnetic elements M constitute a driving assembly for impelling the movable part (holder LH) relative to the fixed part (the housing H and the base B) along the optical axis O.

When a current signal is applied to the coils C, an electromagnetic force can be generated by the coils C and the magnets M, so that the holder LH and the optical element received therein can be driven to move relative to the fixed part (the housing H and the base B) along the optical axis O (Z direction). Hence, the function of auto-focusing (AF) or Optical Image Stabilization (OIS) can be achieved.

FIGS. 3 and 4 further show a magnet HM is disposed on a side of the holder LH, and a magnetic field sensor HS (FIGS. 10 and 11) is disposed on the circuit assembly F. In some embodiments, the magnetic field sensor HS may be a Hall effect sensor, MR sensor, or Fluxgate sensor to detect the position variation of the magnet HM, so that the relative movement between the holder LH and the fixed part (the housing H and the base B) can be determined.

Moreover, it can be seen in FIGS. 1 and 3 that two conductive members BT protrude from the base B in the −Y direction, and they are electrically connected to the circuit assembly F. In some embodiments, the conductive members BT may be integrally formed with the plastic base B by insert molding. Each of the conductive members BT has a contact pad BT1 located at the corner and exposed to the top side of the base B. The lower spring sheets BS are electrically connected to the contact pads BT1 of the conductive members BT by soldering or welding.

As shown in FIGS. 3 and 4, each of the lower spring sheets BS has two connecting portions BS2. The glue may be disposed on the connecting portions BS2 so that the lower spring sheet BS and the base B are adhered to each other by the glue. Specifically, each lower spring sheet BS forms a recessed portion BS3, wherein the recessed portions BS3 of the lower spring sheets BS are respectively located beneath the winding posts LH1 of the holder LH and facing the same direction. In some embodiments, the distance between the recessed portions BS3 is longer than 0.4 mm, and the two wires wound on the winding posts LH1 may be electrically connected to the recessed portions BS3 of the lower spring sheets BS by soldering or welding.

When viewed along the X axis, the magnet HM and the winding posts LH1 at least partially overlap. With the magnet HM and the winding posts LH1 located on the same side of the holder LH, the driving mechanism 100 has an eccentric configuration. Namely, the optical axis O does not overlap the central axis O' of the driving mechanism 100 (FIG. 11) when viewed along the Z axis. Therefore, the driving mechanism 100 can be widely applied in smart phones or other portable electronic devices, particularly suitable for moving the front camera lens of a smart phone or tablet computer.

It should be noted that the optical element (e.g. front camera lens) inside the driving mechanism 100 can be closer to the edge of the electronic device (e.g. smart phone) owing to the eccentric configuration of the driving mechanism 100. Hence, the front screen would not be influenced or spoiled by the optical element, whereby concise and aesthetic appearance of the front screen can be ensured to provide a better user experience.

Figure 5:
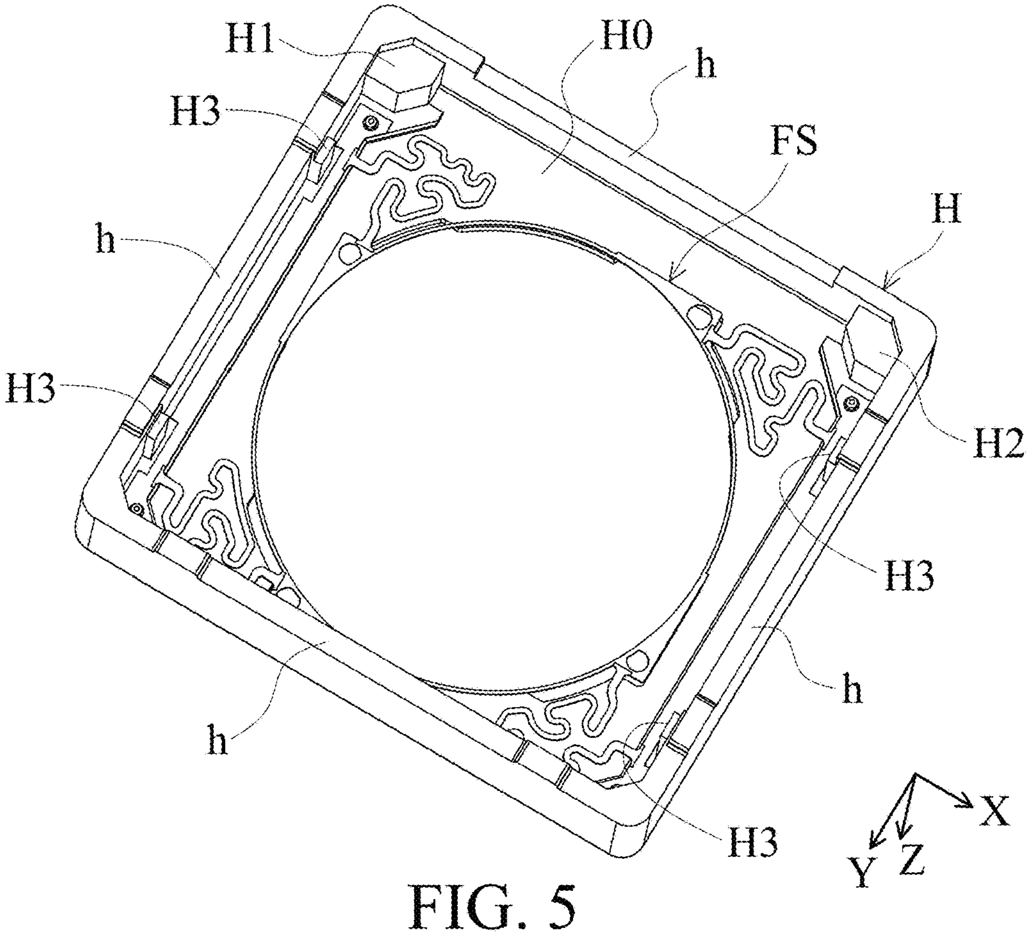
FIG. 5 is a perspective diagram of the upper spring sheet FS and the housing H after assembly.
Figure 6:
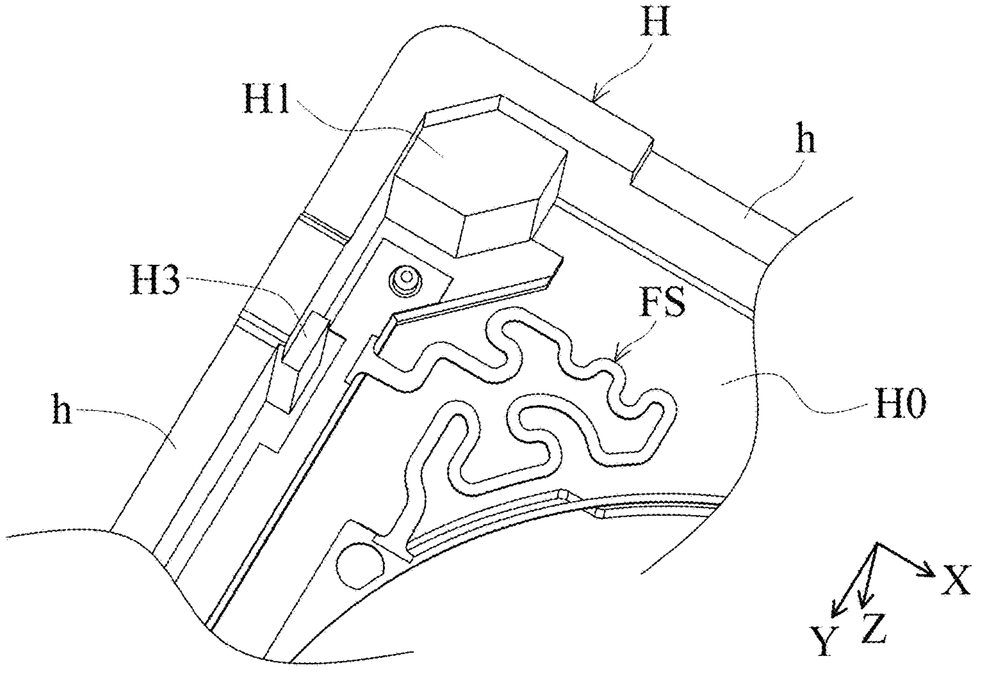
FIG. 6 is an enlarged view of the upper spring sheet FS and the housing H after assembly.

FIG. 5 is a perspective diagram of the upper spring sheet FS and the housing H after assembly. FIG. 6 is an enlarged view of the upper spring sheet FS and the housing H after assembly.

Referring to FIGS. 3-6, the quadrilateral housing H has a top portion H0 and four sidewalls h extending from the top portion H0 along the optical axis O toward the base B. The upper spring sheet FS is mounted on the inner surface of the top portion H0.

Figure 13:
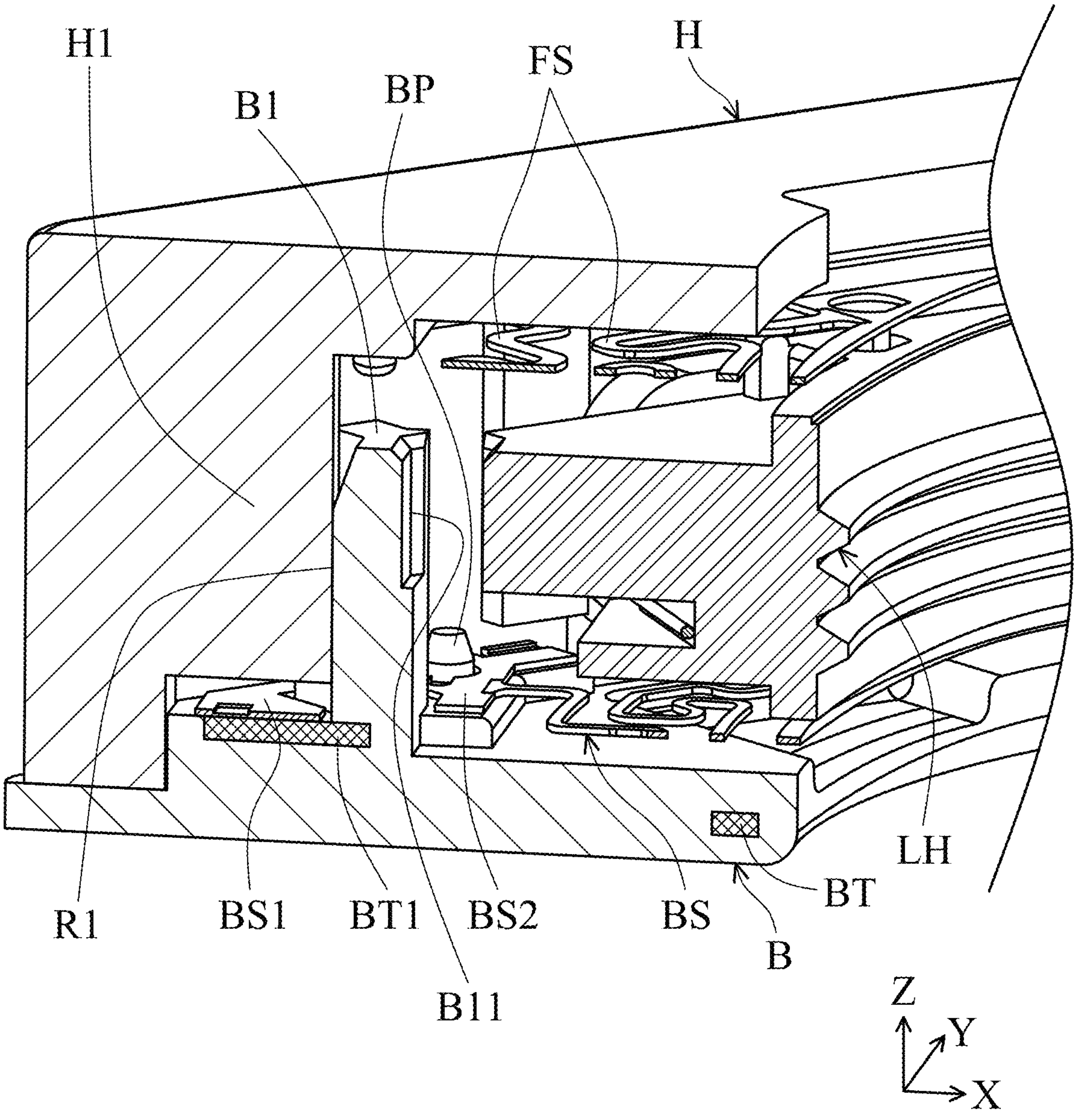
FIG. 13 is a cross-sectional view taken along line A1-A2 in FIG. 1.

As shown in FIG. 5, two protruding structures H1 and H2 are formed at two corners of the top portion H0 and located adjacent to the columns B1 and B2 (FIG. 13). During assembly, the glue may be disposed between the protruding structures H1, H2 and the column B1, B2, thereby enhancing the connection strength of the housing H and the base B.

It can also be seen in FIGS. 5 and 6 that a plurality of ribs H3 are formed on the opposite sidewalls h and extend along the Z axis. Each of the magnetic elements M (e.g. magnets) can be positioned between the adjacent ribs H3 and adhered to the sidewall h during assembly. Therefore, the magnetic elements M can be prevented from separating from the housing H, and they can also be precisely positioned on the sidewalls h to increase the reliability of the driving mechanism 100.

Figure 7:
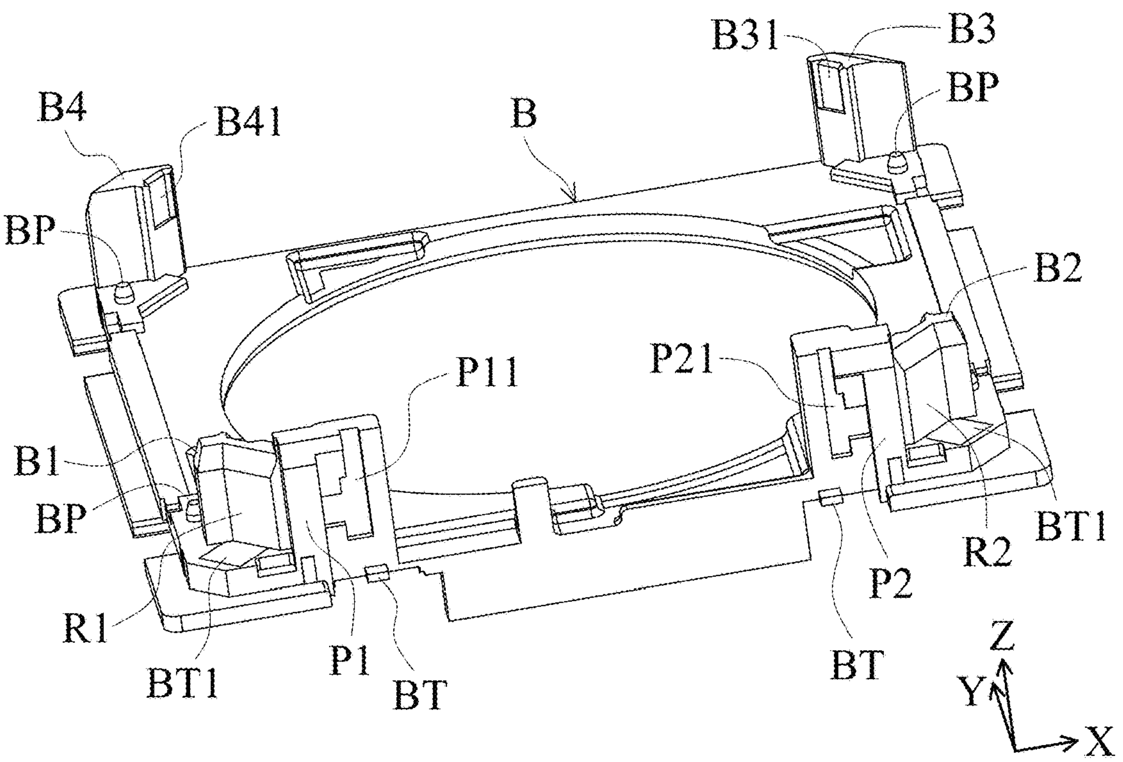
FIG. 7 is a perspective diagram of the base B in FIGS. 3 and 4.
Figure 8:
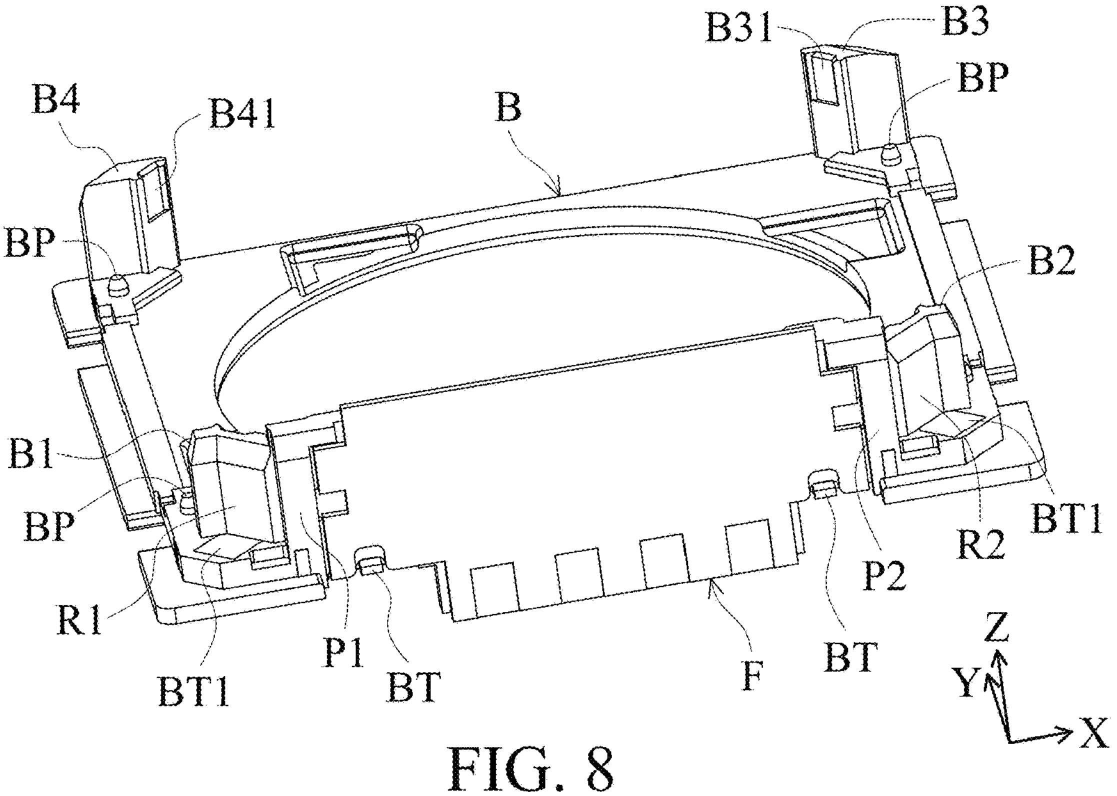
FIG. 8 is a perspective diagram of the circuit assembly F and the base B in FIG. 7 after assembly.
Figure 9:
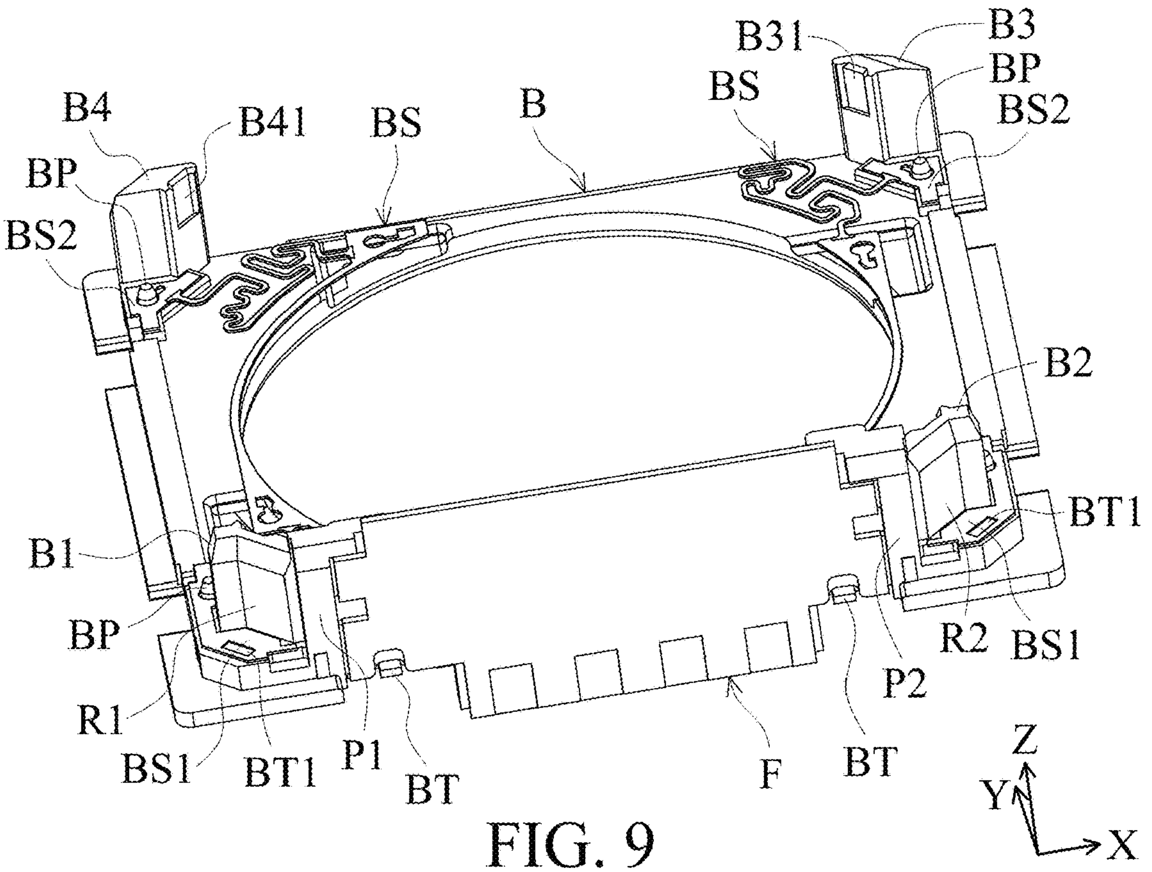
FIG. 9 is a perspective diagram of the lower spring sheets BS, the circuit assembly F, and the base B after assembly.
Figure 10:
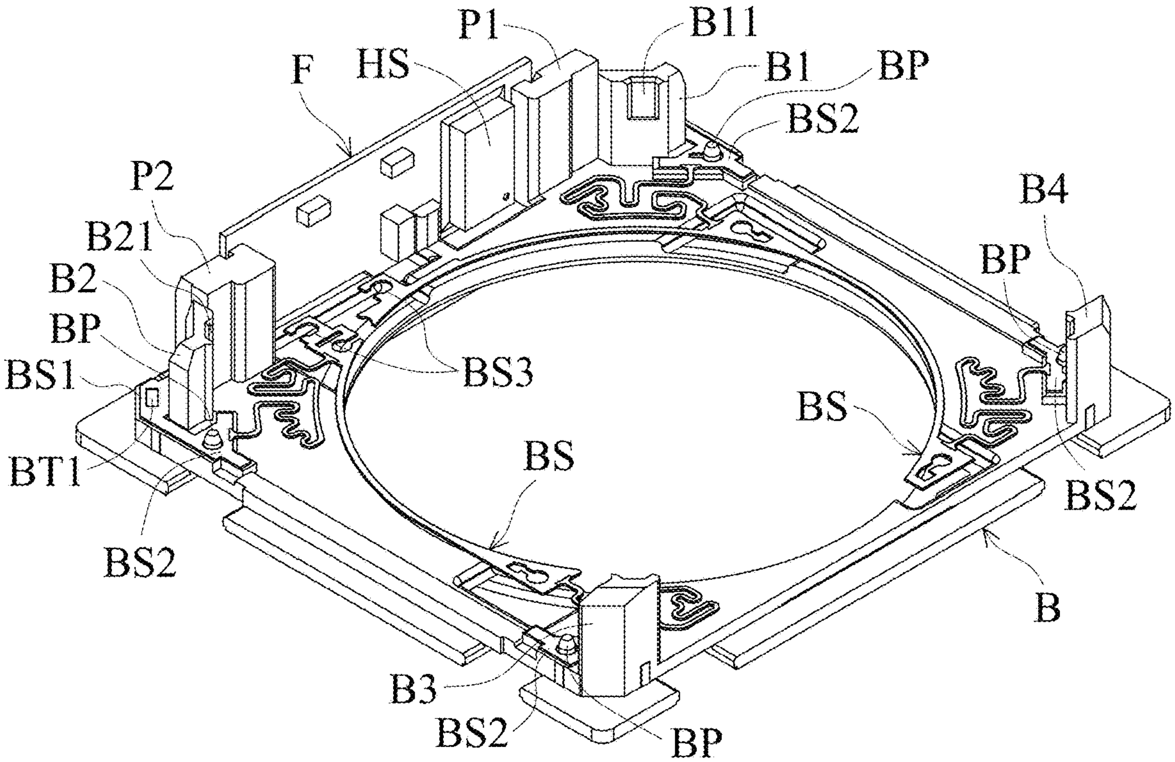
FIG. 10 is another perspective diagram of the lower spring sheets BS, the circuit assembly F, and the base B after assembly.
Figure 11:
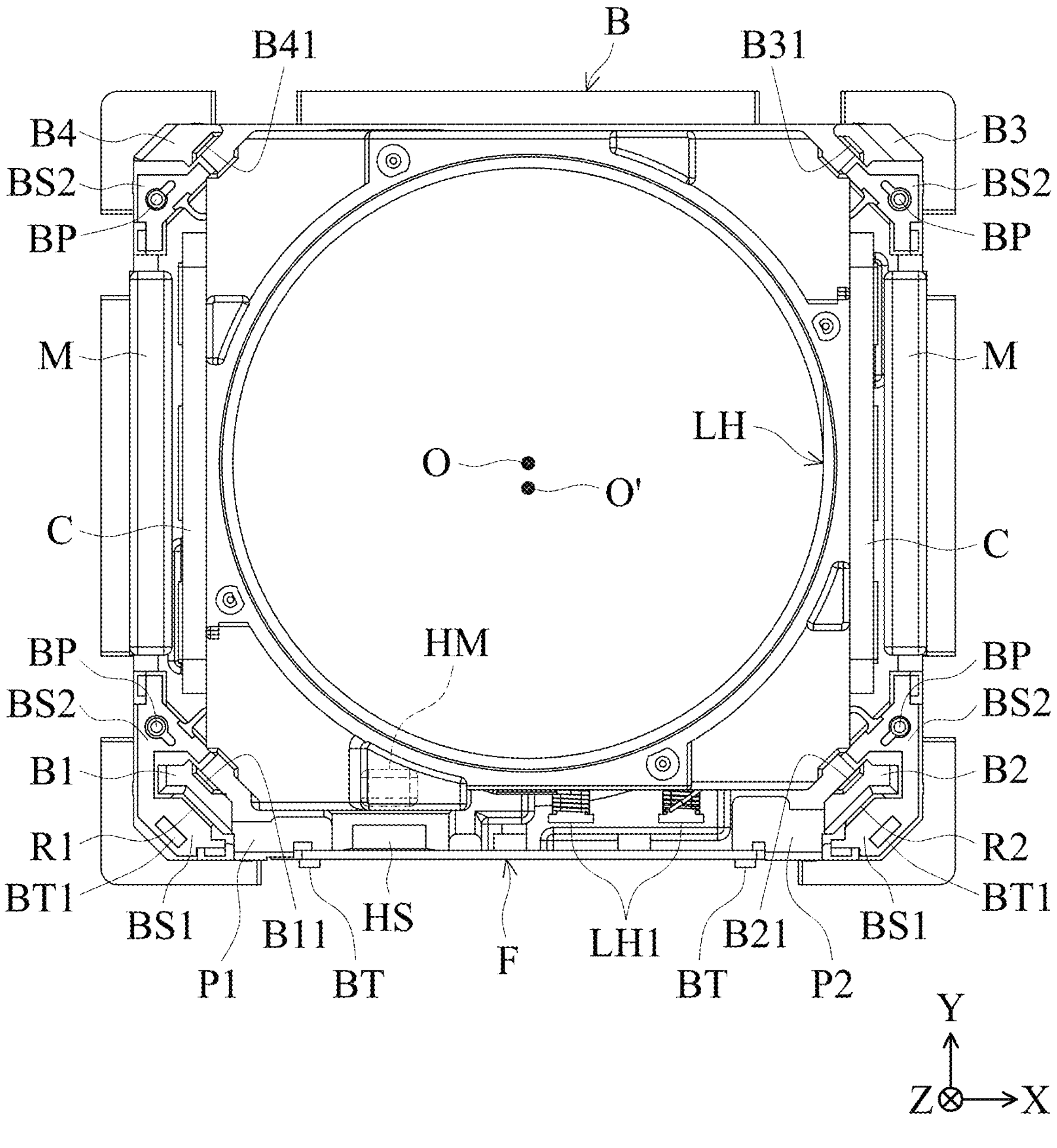
FIG. 11 is a top view of the coils C, the magnetic elements M, the holder LH, the lower spring sheets BS, the circuit assembly F, and the base B after assembly.
Figure 12:
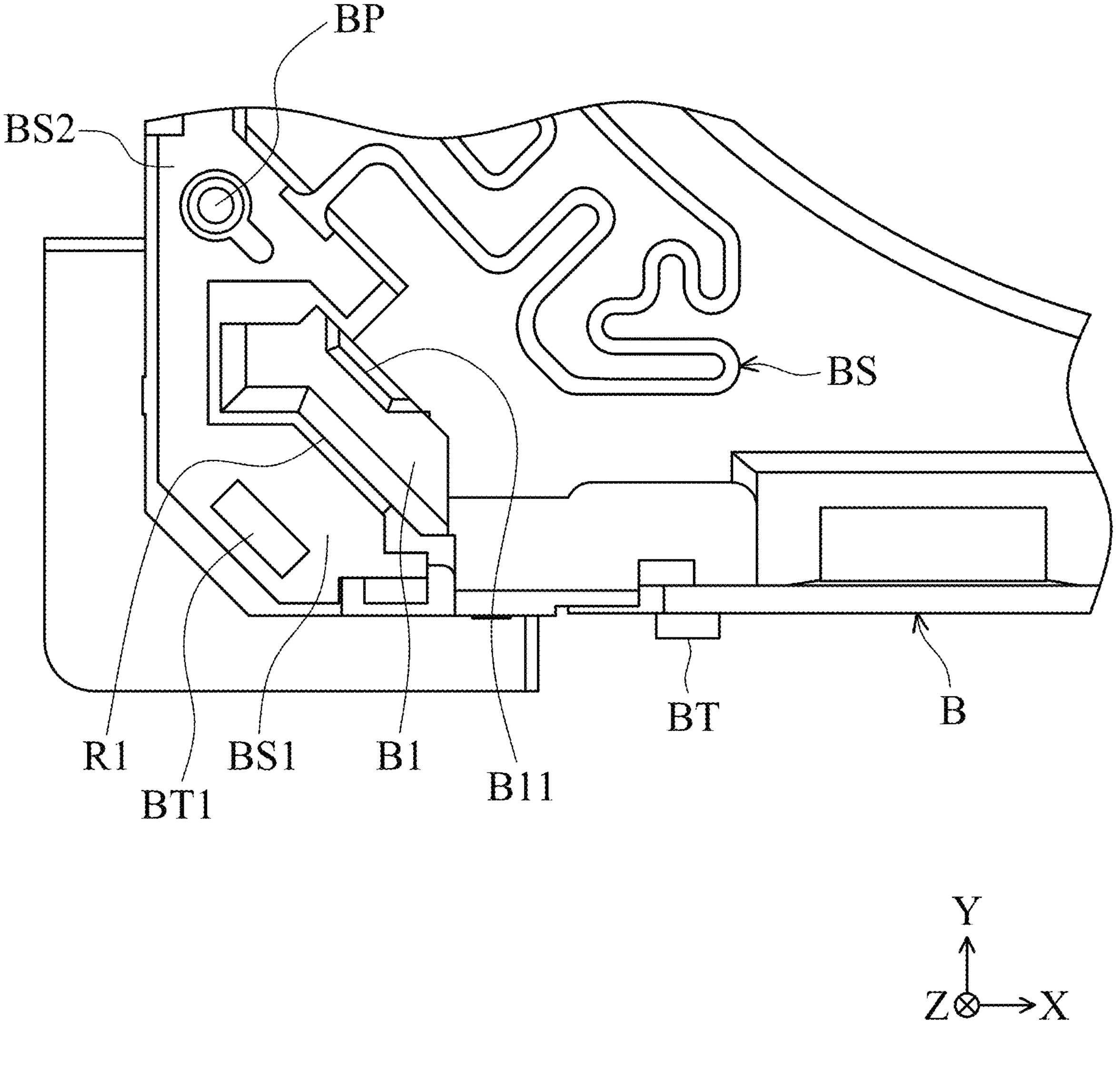
FIG. 12 is a partial enlarged view of FIG. 11 showing the contact pad BT1 of the conductive members BT and the end portion BS1 of the lower spring sheet BS located on the outer side of the column B1.

FIG. 7 is a perspective diagram of the base B in FIGS. 3 and 4. FIG. 8 is a perspective diagram of the circuit assembly F and the base B in FIG. 7 after assembly. FIG. 9 is a perspective diagram of the lower spring sheets BS, the circuit assembly F, and the base B after assembly. FIG. 10 is another perspective diagram of the lower spring sheets BS, the circuit assembly F, and the base B after assembly. FIG. 11 is a top view of the coils C, the magnetic elements M, the holder LH, the lower spring sheets BS, the circuit assembly F, and the base B after assembly. FIG. 12 is a partial enlarged view of FIG. 11 showing the contact pad BT1 of the conductive members BT and the end portion BS1 of the lower spring sheet BS located on the outer side of the column B1.

Referring to FIGS. 7 and 8, the base B has four columns B1-B4 and two restricting structures P1 and P2 extending along the Z axis. The restricting structures P1, P2, the conductive members BT, and the circuit assembly F are located on the same side of the base B. Here, the column B1 (first column) is connected to the restricting structure P1 (first restricting structure), the column B2 (second column) is connected to the restricting structure P2 (second restricting structure), and the circuit assembly F is disposed between the two restricting structures P1 and P2.

Specifically, a first cavity P11 is formed on the outer surface of the restricting structure P1 (first restricting structure), and a second cavity P21 is formed on the outer surface of the restricting structure P2 (second restricting structure). In some embodiments, the glue is disposed in the first and second cavities P11 and P21 during assembly, whereby the circuit assembly F can be firmly adhered to the outer surfaces of the restricting structures P1 and P2 (FIG. 8).

As shown in FIGS. 7-12, the column B1 of the base B has an inner connecting portion B11, the column B2 of the base B has an inner connecting portion B21, the column B3 of the base B has an inner connecting portion B31, and the column B4 of the base B has an inner connecting portion B41. Moreover, the column B1 of the base B has an outer connecting portion R1, and the column B2 of the base B has an outer connecting portion R2.

It can be seen in FIGS. 7-12 that each of the inner connecting portions B11, B21, B31, and B41 forms a recess for receiving the damping gel, and each of the outer connecting portions R1 and R2 forms a recess for receiving the glue.

During assembly of the driving mechanism 100, the damping gel is connected between the inner connecting portions B11-B41 of the columns B1-B4 and the four corners of the holder LH. Hence, the holder LH is movably connected to the columns B1-B4 by the damping gel.

Additionally, the glue can be disposed on the outer connecting portions R1, R2 of the columns B1, B2 and connected to the protruding structures H1, H2 at the adjacent corners of the housing H, whereby the base B and the housing H can be firmly adhered to each other.

Still referring to FIGS. 7-12, the two contact pads BT1 of the conductive members BT are exposed to the corners of the base B and respectively located adjacent to the outer connecting portions of the columns B1 and B2. The connecting portions BS1 of the lower spring sheets BS are disposed above the contact pads BT1 of the conductive members BT. In some embodiments, the connecting portions BS1 of the lower spring sheets BS and the contact pads BT1 of the conductive members BT may be electrically connected to each other by welding or soldering.

It should be noted that the outer connecting portions R1 and R2 of the columns B1 and B2 respectively have a depressed structure (recess). As shown in FIGS. 11 and 12, the connecting portions BS1 of the lower spring sheets BS and the contact pads BT1 of the conductive members BT are located on the outer side of the columns B1 and B2. Therefore, the space inside the driving mechanism 100 can be efficiently utilized, thereby achieving miniaturization of the product.

Moreover, four bumps BP are formed at the four corners of the base B, and they are fastened through the connecting portions BS2 of the lower spring sheets BS during assembly. In some embodiments, the glue can be disposed on the bumps BP and the connecting portions BS2, whereby the base B and the lower spring sheets BS are firmly connected to each other.

FIG. 13 is a cross-sectional view taken along line A1-A2 in FIG. 1. Referring to FIG. 13, the connecting portion R1 of the column B1 faces the protruding structure H1 at the corner of the housing H, and the bump BP extends through the connecting portion BS2 of the lower spring sheet BS in the Z direction.

Specifically, the connecting portion BS1 of the lower spring sheet BS and the contact pad BT1 of the conductive member BT are both located on the outer side of the column B1. It can be seen in FIG. 13 that the protruding structure H1 of the housing H, the connecting portion BS1 of the lower spring sheet BS, and the contact pad BT1 of the conductive member BT at least partially overlap along the Z axis. In this embodiment, the connecting portion BS1 of the lower spring sheet BS is situated between the protruding structure H1 of the housing H and the contact pad BT1 of the conductive member BT along the Z axis.

With the configuration as described above, the space inside the driving mechanism 100 can be efficiently utilized, and miniaturization of the product can also be achieved. Furthermore, the connection strength of the housing H and the base B can also be enhanced, thus increasing the reliability and performance of the driving mechanism 100.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification.

As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A driving mechanism for moving an optical element that has an optical axis, the driving mechanism comprising:
- a fixed part, including a housing and a base connected to each other, wherein the housing has a top portion and at least a sidewall extending from the top portion toward the base, and the base has a first restricting structure and a second restricting structure extending toward the housing;
- a movable part, movably connected to the fixed part for holding the optical element; and
- a driving assembly, configured for moving the movable part relative to the fixed part;
- wherein the base further has a first column and a second column, the first column is connected to the first restricting structure, the second column is connected to the second restricting structure, and the first and second columns and the first and second restricting structures extend into the housing;
- wherein the housing further has a protruding structure that protrudes toward the interior of the driving mechanism, and the first column has an outer connecting portion that forms a depressed structure depressed toward the interior of the driving mechanism, wherein the protruding structure and the depressed structure are located at a corner of the driving mechanism and adhered to each other.

2. The driving mechanism as claimed in claim 1, further comprising an upper spring sheet disposed on an inner surface of the top portion.

3. The driving mechanism as claimed in claim 2, wherein two ribs are formed on the sidewall, and the driving assembly includes a coil and a magnetic element, wherein the coil is disposed on the movable part, and the magnetic element is disposed on the sidewall and positioned between the ribs.

4. The driving mechanism as claimed in claim 2, further comprising a circuit assembly positioned between the first and second restricting structures.

5. The driving mechanism as claimed in claim 4, wherein a first cavity is formed on the first restricting structure, a second cavity is formed on the second restricting structure, and a glue is disposed in the first and second cavities for connecting the circuit assembly to the first and second restricting structures.

6. The driving mechanism as claimed in claim 1, further comprising a damping gel, wherein the first column further has an inner connecting portion, and the damping gel is connected between the movable part and the inner connecting portion.

7. The driving mechanism as claimed in claim 6, wherein the inner connecting portion forms a recess for receiving the damping gel.

8. The driving mechanism as claimed in claim 1, further comprising a lower spring sheet and a conductive member, wherein the lower spring sheet is connected between the base and the movable part, the conductive member is embedded in the base and has a contact pad exposed to the top side of the base, and the lower spring sheet has an end portion electrically connected to the contact pad, wherein the end portion and the contact pad are located on the outer side of the first column.

9. The driving mechanism as claimed in claim 8, wherein the protruding structure of the housing, the end portion of the lower spring sheet, and the contact pad of the conductive member partially overlap along the optical axis.

10. The driving mechanism as claimed in claim 8, wherein the end portion of the lower spring sheet is situated between the protruding structure of the housing and the contact pad of the conductive member along the optical axis.

11. The driving mechanism as claimed in claim 2, further comprising two wires and two lower spring sheets, wherein the lower spring sheets are connected between the base and the movable part, the movable part has two winding posts, and each of the lower spring sheets has a recessed portion, wherein the wires are wound on the winding posts and electrically connected to the recessed portions of the lower spring sheets.

12. The driving mechanism as claimed in claim 11, wherein the recessed portions are facing the same direction.

13. A driving mechanism for moving an optical element that has an optical axis, the driving mechanism comprising:

a fixed part, including a housing and a base connected to each other, wherein the housing has a top portion and at least a sidewall extending from the top portion toward the base;

a movable part, movably connected to the fixed part for holding the optical element;

a driving assembly, configured for moving the movable part relative to the fixed part; and an upper spring sheet, disposed on an inner surface of the top portion;

wherein the base forms a first column extending toward the housing, the housing forms a protruding structure that protrudes toward the interior of the driving mechanism, and the first column has an outer connecting portion that forms a depressed structure depressed toward the interior of the driving mechanism and adhered to the protruding structure, wherein the protruding structure and the depressed structure are located at a corner of the driving mechanism.

14. The driving mechanism as claimed in claim 13, further comprising a damping gel, wherein the first column further has an inner connecting portion, and the damping gel is connected between the movable part and the inner connecting portion.

15. The driving mechanism as claimed in claim 14, wherein the inner connecting portion forms a recess for receiving the damping gel.

16. The driving mechanism as claimed in claim 13, further comprising a lower spring sheet and a conductive member, wherein the lower spring sheet is connected between the base and the movable part, the conductive member is embedded in the base and has a contact pad exposed to the top side of the base, and the lower spring sheet has an end portion electrically connected to the contact pad, wherein the end portion and the contact pad are located on the outer side of the first column.

17. The driving mechanism as claimed in claim 16, wherein the protruding structure of the housing, the end portion of the lower spring sheet, and the contact pad of the conductive member partially overlap along the optical axis.

18. The driving mechanism as claimed in claim 16, wherein the end portion of the lower spring sheet is situated between the protruding structure of the housing and the contact pad of the conductive member along the optical axis.

* * * * *